US012567704B2

(12) United States Patent
Workman et al.

(10) Patent No.: US 12,567,704 B2
(45) Date of Patent: Mar. 3, 2026

(54) POWER CONNECTOR

(71) Applicant: TE Connectivity Solutions GmbH, Schaffhausen (CH)

(72) Inventors: Emma L. Workman, Middletown, PA (US); David Swartz, Middletown, PA (US); Vinayakumar Shettar, Middletown, PA (US); Alexander Brong, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 316 days.

(21) Appl. No.: 18/492,414

(22) Filed: Oct. 23, 2023

(65) Prior Publication Data

US 2025/0132523 A1 Apr. 24, 2025

(51) Int. Cl.

*H01R 13/641* (2006.01)
*H01R 13/52* (2006.01)
*H01R 13/58* (2006.01)

(52) U.S. Cl.

CPC ....... *H01R 13/641* (2013.01); *H01R 13/5205* (2013.01); *H01R 13/58* (2013.01); *H01R 13/521* (2013.01)

(58) Field of Classification Search

CPC .. H01R 13/641; H01R 13/5205; H01R 13/58; H01R 13/4367; H01R 13/5208; H01R 13/5812; H01R 2105/00; H01R 13/4223; H01R 13/521; H01R 13/02; H01R 13/40; H01R 13/502

See application file for complete search history.

(56) References Cited

U.S. PATENT DOCUMENTS 6,402,573 B1 * 6/2002 Yeomans ........... H01R 13/4362 439/752
10,355,393 B2 * 7/2019 Yi ...................... H01R 13/5208
11,031,719 B2 * 6/2021 Somanathapura Ramanna ........... H01R 13/28

* cited by examiner

*Primary Examiner* — Briggitte R. Hammond
(74) *Attorney, Agent, or Firm* — Jay J. Hoette; Carroll, Hoette & Butscher, LLC

(57) ABSTRACT

A power connector includes a housing that extends between a mating end and a wire end. The mating end configured to be mated with a mating power connector. The housing includes a terminal channel. The housing includes a chamber at the wire end. The power connector includes a terminal received in the terminal channel. The terminal includes a mating end configured to be mated to a mating terminal of the mating power connector. The terminal includes a terminating end terminated to a power wire. The power wire extends from the wire end of the housing. The power connector includes a TPA device received in the chamber. The TPA device includes a terminal blocking element rearward of the terminal for blocking and position assurance of the terminal in the terminal channel. The TPA device includes a sealing element for sealing the chamber of the housing.

23 Claims, 7 Drawing Sheets

POWER CONNECTOR

BACKGROUND OF THE INVENTION

The subject matter herein relates generally to power connectors.

Conventional power connectors are used in various applications. For example, power connectors may be used in appliances, vehicles, computers, network devices, industrial applications, or other applications. In some applications, the power connectors are provided in a sealed environment, such as being surrounded by potting material or insulating foam to secure the power connector within a machine or device, such as an appliance. For example, insulating material may form a thermal shell around portions of the appliance. In applications when the surrounding material is applied in place around the power connector, problems may arise with the material entering the enclosure of the power connector, which can lead to connection problems for the power connector in field failures and/or rework costs. For example, if the power connector is not sealed to the environment, the material may enter the internal space of the power connector through openings or interfaces between the various components of the power connector. For example, some power connectors may include a terminal position assurance (TPA) device at the rear of the power connector. The material may enter the housing of the power connector at the interface between the TPA device and the housing or at the interface between the TPA device and the power wires.

A need remains for a robust power connector that may be sealed to prevent material or debris from entering the internal portion of the power connector.

BRIEF DESCRIPTION OF THE INVENTION

In one embodiment, a power connector is provided and includes a housing that extends between a mating end and a wire end. The mating end configured to be mated with a mating power connector. The housing includes a terminal channel. The housing includes a chamber at the wire end. The power connector includes a terminal received in the terminal channel. The terminal includes a mating end configured to be mated to a mating terminal of the mating power connector. The terminal includes a terminating end terminated to a power wire. The power wire extends from the wire end of the housing. The power connector includes a terminal position assurance (TPA) device received in the chamber. The TPA device includes a terminal blocking element rearward of the terminal for blocking and position assurance of the terminal in the terminal channel. The TPA device includes a sealing element for sealing the chamber of the housing.

In another embodiment, a power connector is provided and includes a housing that extends between a mating end and a wire end. The mating end configured to be mated with a mating power connector. The housing includes a terminal channel. The housing includes a chamber at the wire end. The power connector includes a terminal received in the terminal channel. The terminal includes a mating end configured to be mated to a mating terminal of the mating power connector. The terminal includes a terminating end terminated to a power wire. The power wire extends from the wire end of the housing. The power connector includes a terminal position assurance (TPA) device received in the chamber. The TPA device includes a terminal blocking element rearward of the terminal for blocking and position assurance of the terminal in the terminal channel. The TPA device includes a sealing element for sealing the chamber of the housing. The TPA device includes a wire seal configured to be sealed between the TPA device and the power wire.

In a further embodiment, a power connector is provided and includes a housing extends between a mating end and a wire end. The mating end configured to be mated with a mating power connector. The housing includes a terminal channel. The housing includes a chamber at the wire end. The power connector includes a terminal received in the terminal channel. The terminal includes a mating end configured to be mated to a mating terminal of the mating power connector. The terminal includes a terminating end terminated to a power wire. The power wire extends from the wire end of the housing. The power connector includes a terminal position assurance (TPA) device received in the chamber. The TPA device includes a TPA base that includes a wire channel configured to receive the power wire. The TPA base includes a sealing element for sealing the chamber of the housing. The TPA device includes a terminal blocking element rearward of the terminal for blocking and position assurance of the terminal in the terminal channel. The TPA device includes a cover coupled to the TPA base to close the wire channel.

DETAILED DESCRIPTION OF THE INVENTION

Figure 1:
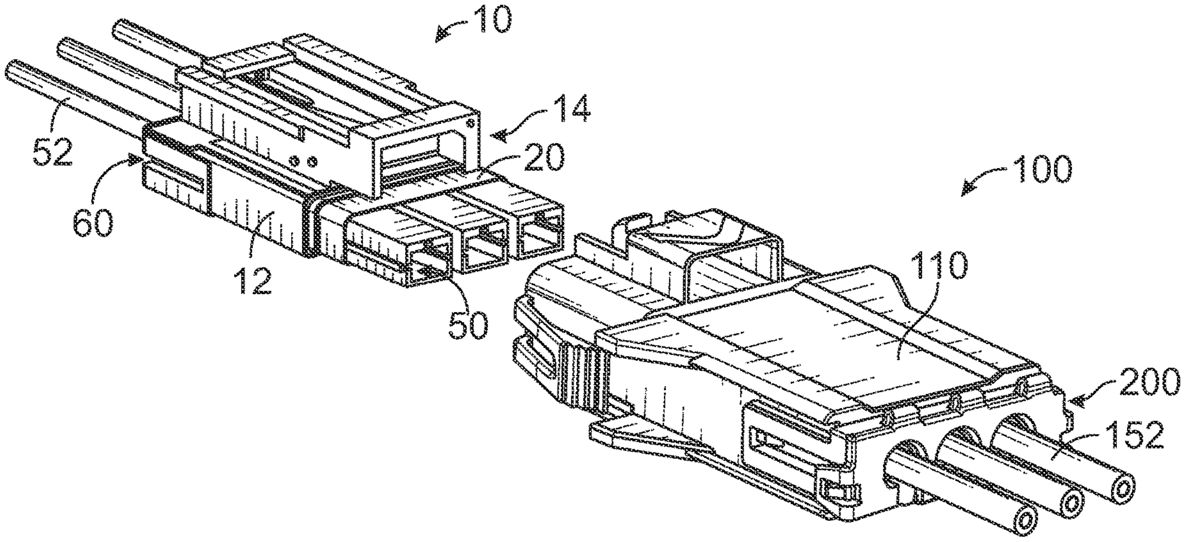
FIG. 1 illustrates a power connector in accordance with an exemplary embodiment.

FIG. 1 illustrates a power connector 100 in accordance with an exemplary embodiment. The power connector 100 is configured to be electrically connected with a mating power connector 10. The power connector 100 may be used in various applications, such as appliances, automotive, industrial, networking, computer, or other applications. For example, in an exemplary embodiment, the power connector 100 may be used in an appliance, such as a refrigerator, to power one or more components of the refrigerator, such as the lights or icemaker of the refrigerator. The power connector 100 may be used in other types of devices in alternative embodiments.

In an exemplary embodiment, the power connector 100 may be integrated into the device (appliance). For example, the power connector 100 may be integrated into the insulating foam of the refrigerator to fix the power connector 100 within the appliance. The insulating foam may be formed in place around the power connector 100 to encapsulate a portion of the power connector 100 within the appliance. In various embodiments, the insulating foam may be formed around the power connector 100 after the power connector 100 is mated with the mating power connector 10. In an exemplary embodiment, the power connector 100 is sealed to prevent the material, such as the insulating foam, from entering the internal portion of the power connector 100 to disrupt the terminals of the power connector 100. As such, the power connector 100 provides a robust electrical connection that may be used in a particular application, such as in the appliance.

The power connector 100 includes a housing 110 holding one or more terminals 150 that are terminated to ends of power wires 152. The power connector 100 includes a terminal position assurance (TPA) device 200 used to improve the quality and reliability of the power connector 100 by preventing terminal backout and assuring proper positioning of the terminals in the housing 110. In an exemplary embodiment, the TPA device 200 provides a sealed interface with the housing 110 and/or the power wires 152 to prevent material ingress into the housing 110, such as ingress of the insulation foam during application of the foam around the power connector 100.

The mating power connector 10 includes a housing 12 holding one or more terminals 50 (shown in FIG. 2), which are terminated to ends of corresponding power wires 52. In an exemplary embodiment, the terminals 50 are socket contacts having receptacles that receive the terminals of the power connector 100. However, the terminals 50 may include other types of contacts in alternative embodiments, such as pin contacts, tab contacts, beam contacts, blade contacts, and the like. The mating power connector 10 may include a TPA device 60. In an exemplary embodiment, the housing 12 includes a latching feature 14, such as a deflectable latch, configured to be latchably coupled to the power connector 100. In an exemplary embodiment, the mating power connector 10 includes a connector seal 20 configured to provide a sealed interface between the mating power connector 10 and the power connector 100.

Figure 2:
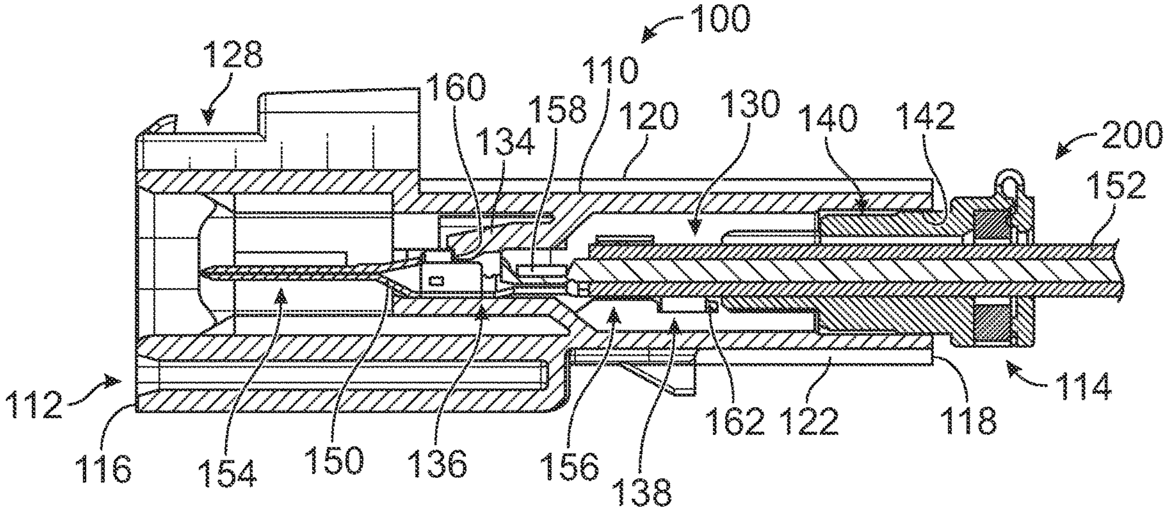
FIG. 2 is a cross-sectional view of the power connector in accordance with an exemplary embodiment.
Figure 3:
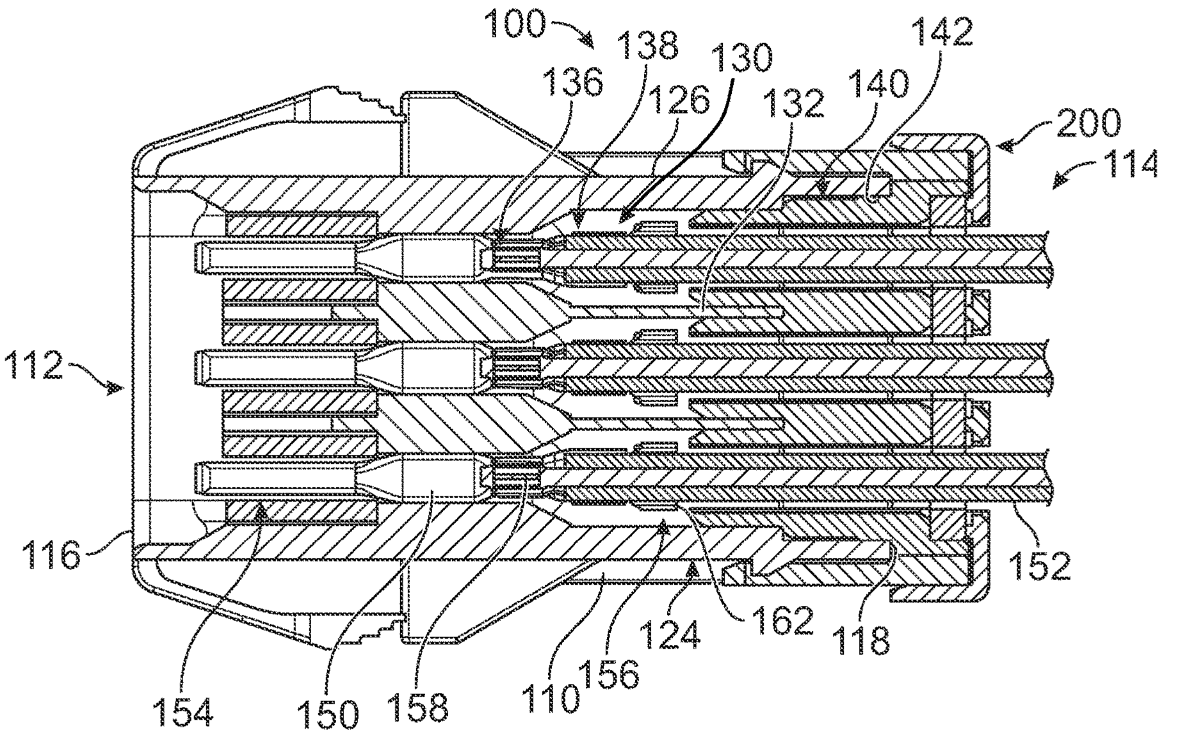
FIG. 3 is a cross-sectional view of the power connector in accordance with an exemplary embodiment.

FIG. 2 is a cross-sectional view of the power connector 100 in accordance with an exemplary embodiment. FIG. 3 is a cross-sectional view of the power connector 100 in accordance with an exemplary embodiment. FIGS. 2 and 3 illustrates the terminals 150 and the power wires 152 arranged in the housing 110 of the power connector 100. FIGS. 2 and 3 illustrates the TPA device 200 arranged in the housing 110 of the power connector 100.

The housing 110 holds the terminals 150 for mating with the mating power connector 10 (FIG. 1). In an exemplary embodiment, the housing 110 is manufactured from a dielectric material, such as a plastic material. The housing 110 may be a molded structure. In various embodiments, the housing 110 is a single piece housing. However, in alternative embodiments, the housing 110 may be a multipiece housing.

The housing 110 extends between a mating end 112 and a wire end 114. The mating end 112 is configured to be mated with the mating power connector 10. The power wires 150 to extend from the wire end 114. In the illustrated embodiment, the wire end 114 is opposite the mating end 112. However, other orientations are possible in alternative embodiments. For example, the housing 110 may be a right angle housing having a wire end 114 perpendicular to the mating end 112. The housing 110 extends between a front 116 and a rear 118. In the illustrated embodiment, the mating end 112 is provided at the front 116 and the wire end 114 is provided at the rear 118. The housing 110 includes a top 120 and a bottom 122. The housing 110 includes sides 124, 126 that extend between the top 120 and the bottom 122. In the illustrated embodiment, the housing 110 is parallelepiped (for example, generally rectangular). Other shapes are possible in alternative embodiments.

In an exemplary embodiment, the housing 110 includes a latching feature 128 configured to be latchably coupled to the mating power connector 10. In the illustrated embodiment, the latching feature 128 is provided at the top 120. Other locations are possible in alternative embodiments. The latching feature 128 may include one or more latching surfaces configured to interface with the latching feature 14 of the mating power connector 10. Other types of securing features may be used in alternative embodiments, such as fasteners, clips, and the like.

The housing 110 includes terminal channels 130 that receive the corresponding terminals 150. In the illustrated embodiment, the housing 110 includes three terminal channels 130 that receive the corresponding terminals 150. Greater or fewer terminal channels 130 may be provided in alternative embodiments. The terminal channels 130 are separated from each other by separating walls 132. In an exemplary embodiment, the housing 110 includes primary latches 134 in the corresponding terminal channels 130. The primary latches 134 are used to secure the terminals 150 in the terminal channels 130. In an exemplary embodiment, the primary latches 134 are deflectable latches configured to be latched behind a latching surface of the corresponding terminal 150. In the illustrated embodiment, the primary latches 134 are located along the top sides of the terminals 150. Other locations are possible in alternative embodiments. In an exemplary embodiment, each terminal channel 130 includes a forward portion 136 and a rearward portion 138. The rearward portion 138 receives the power wire 152 in addition to the terminal 150. The rearward portion 138 may be oversized relative to the forward portion 136 to receive both the power wire 152 and the terminal 150. In the illustrated embodiment, the primary latch 134 is located in the forward portion 136. The housing 110 may include angled walls that transition between the forward portion 136 and the rearward portion 138 to guide the terminal 150 into the forward portion 136 as the terminal 150 is loaded into the terminal channel 130.

The TPA device 200 is used as a secondary securing feature to retain the terminals 150 in the terminal channels 130, such as should the primary latches 134 break or fail. Optionally, portions of the TPA device 200 may extend into the rearward portions 138 of the terminal channels 130 to interface with the terminals 150. In an exemplary embodiment, the TPA device 200 ensures that the terminals 150 are fully loaded into the terminal channels 130 and properly interacting with the primary latches 134. For example, the TPA device 200 may be unable to be fully loaded into the housing 110 if one or more of the terminals 150 are improperly loaded into the housing 110 to provide a visual indicator to the installer that the terminals 150 are improperly loaded into the housing 110. In other various embodiments, the TPA device 200 may operate to push the terminals 150 forward in the terminal channels 130 to the fully loaded position where the primary latches 134 are able to latchably couple to the terminals 150.

In an exemplary embodiment, the housing 110 includes a chamber 140 that receives the TPA device 200. In the illustrated embodiment, the chamber 140 is provided at the rear 118 of the housing 110. The chamber 140 is open to the terminal channels 130. The terminals 150 may be loaded into the corresponding terminal channels 130 through the chamber 140. The chamber 140 is an enlarged area sized and shaped to receive the TPA device 200. In an exemplary embodiment, the TPA device 200 may be sealingly connected to the housing 110 in the chamber 140. For example, the TPA device 200 may engage or interface with an interior surface 142 of the housing 110 that defines the chamber 140. The TPA device 200 may prevent material, such as the insulating foam, from ingress into the interior of the housing 110 between the TPA device 200 and the interior surface 142. For example, the TPA device 200 may engage the interior surface 142 by an interference fit preventing or eliminating any space between the TPA device 200 and the interior surface 142 for ingress of the material.

In an exemplary embodiment, each terminal 150 includes a mating end 154 and a terminating end 156. The mating end 154 is configured for mating with the terminal 50 of the mating power connector 10. In various embodiments, the mating end 154 may include a tab contact configured to be plugged into the socket of the terminal 50. Other types of contacts may be used in alternative embodiments, such as a pin, a socket, a blade, a spring beam, or another type of contact. The terminating end 156 is configured to be terminated to the power wire 152. In an exemplary embodiment, the terminating end 156 includes a crimp barrel 158 configured to be crimped to the end of the power wire 152, such as to the center conductor and the jacket of the power wire 152. Other types of terminating features may be used in alternative embodiments, such as an insulation displacement contact, a weld pad, a solder portion, or another type of terminating feature.

In an exemplary embodiment, the terminal 150 includes a latching element 160. The primary latch 134 is configured to interface with the latching element 160 to secure the terminal 150 in the terminal channel 130. The latching element 160 may be a wall or surface configured to be engaged by the primary latch 134. The in an exemplary embodiment, the terminal 150 includes a stabilizing feature 162. The stabilizing feature 162 is configured to interface with the TPA device 200 to block or prevent pullout of the terminal 150 from the terminal channel 130. The stabilizing feature 162 may be located at the rear of the terminal 150. The stabilizing feature 162 may be defined by a wall or tab at the rear of the terminal 150. The stabilizing feature 162 may be defined by the crimp barrel 158.

Figure 4:
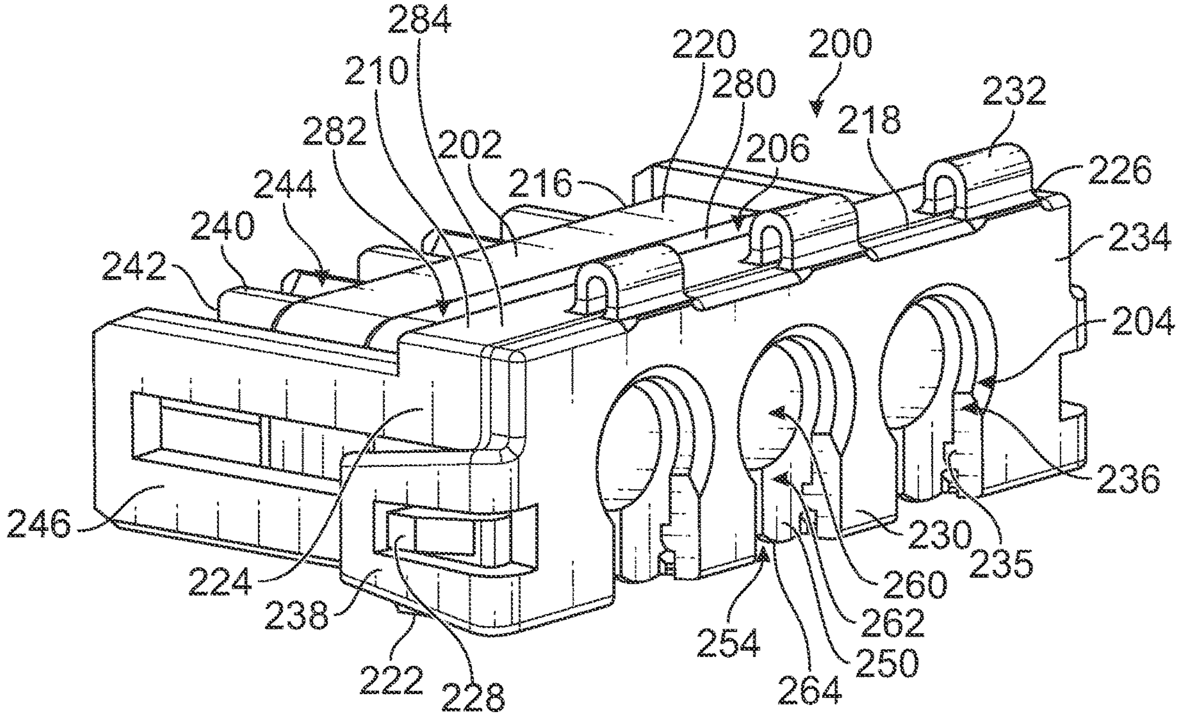
FIG. 4 is a rear perspective view of the TPA device in accordance with an exemplary embodiment.
Figure 5:
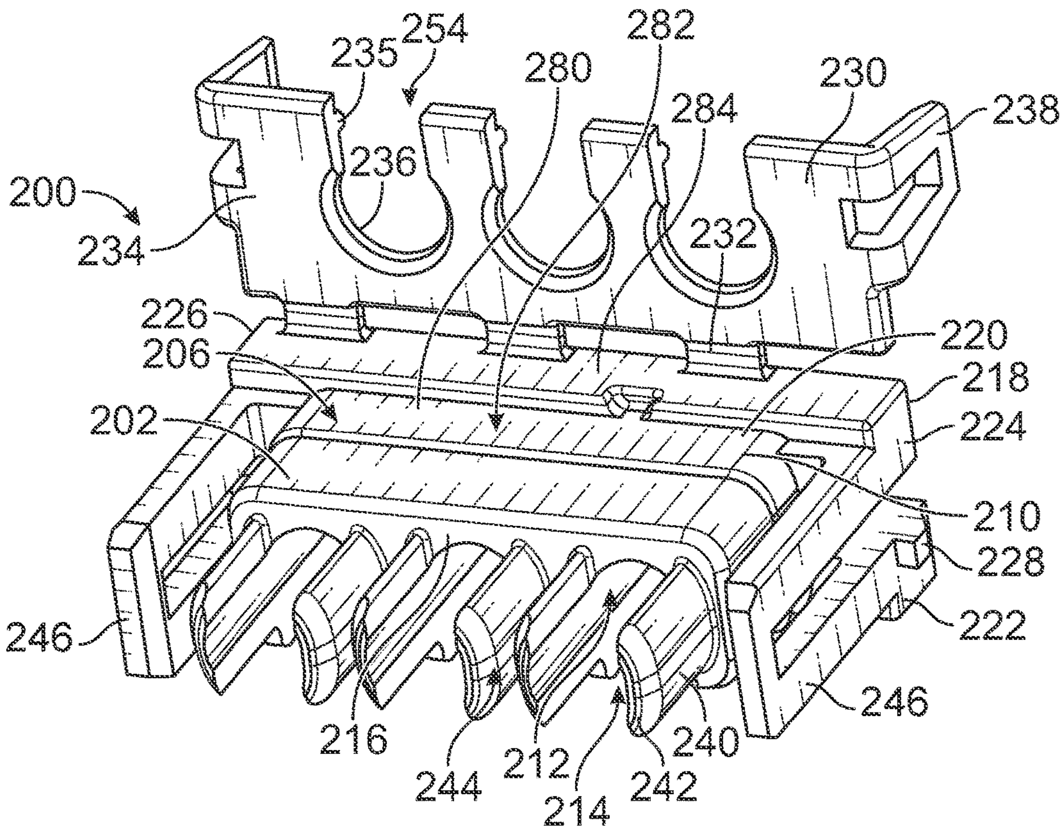
FIG. 5 is a front perspective view of a portion of the TPA device in accordance with an exemplary embodiment.
Figure 6:
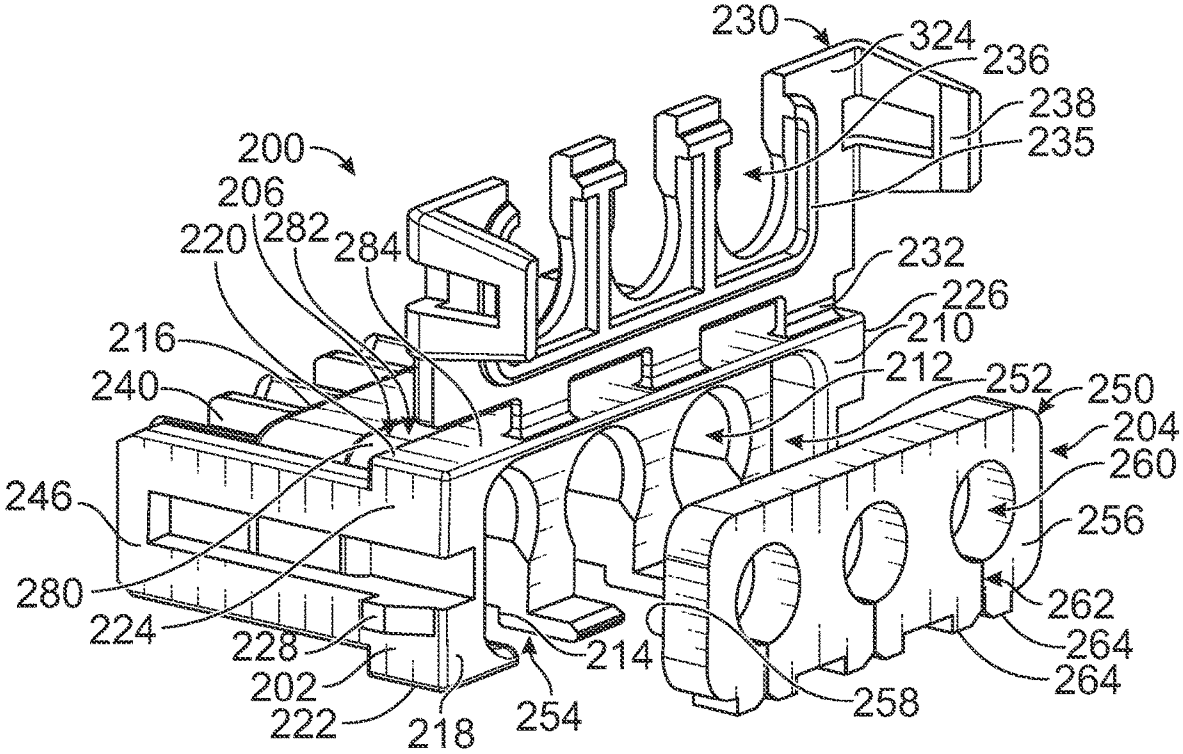
FIG. 6 is an exploded, rear perspective view of the TPA device in accordance with an exemplary embodiment.
Figure 7:
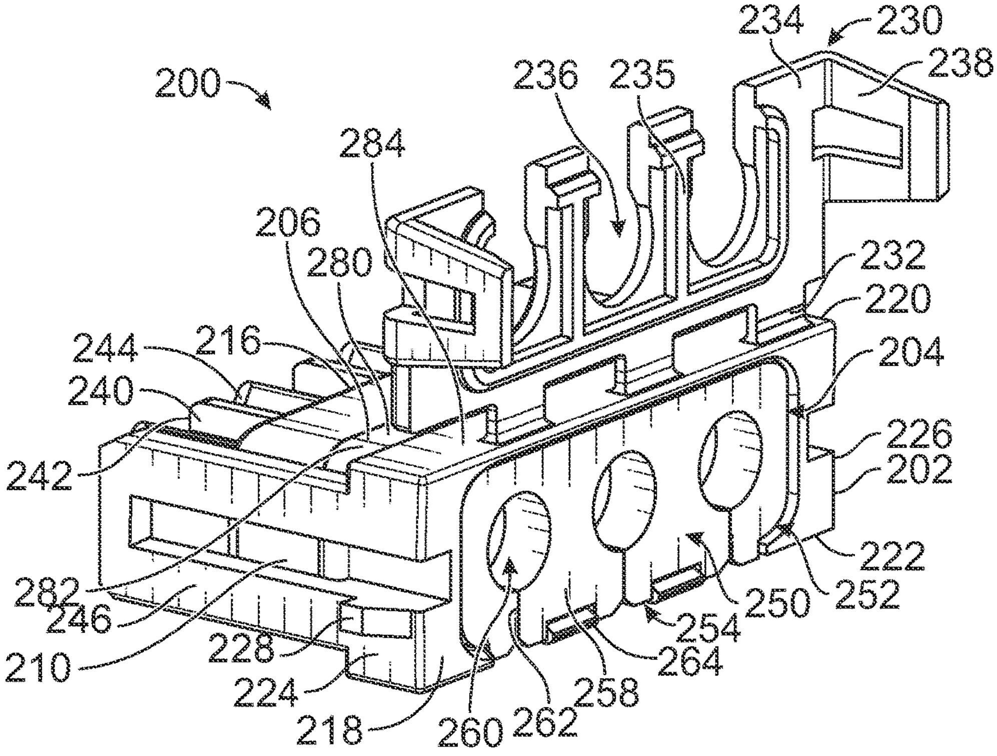
FIG. 7 is a partially assembled, rear perspective view of the TPA device in accordance with an exemplary embodiment.

FIG. 4 is a rear perspective view of the TPA device 200 in accordance with an exemplary embodiment. FIG. 5 is a front perspective view of a portion of the TPA device 200 in accordance with an exemplary embodiment. FIG. 6 is an exploded, rear perspective view of the TPA device 200 in accordance with an exemplary embodiment. FIG. 7 is a partially assembled, rear perspective view of the TPA device 200 in accordance with an exemplary embodiment.

The TPA device 200 includes a body 202 configured to receive the power wires 152 and interface with the terminals 150 to retain the terminals 150 in the housing 110 (shown in FIGS. 2 and 3). In an exemplary embodiment, the body 202 is manufactured from a dielectric material, such as a plastic material. The body 202 may be a molded part. In an exemplary embodiment, the TPA device 200 includes a wire sealing portion 204 configured to be sealed to the power wires 152 and a housing sealing portion 206 configured to be sealed to the housing 110. In an exemplary embodiment, the TPA device 200 includes a wire seal 250 at the wire sealing portion 204. The wire seal 250 is separate and discrete from the body 202. The wire seal 250 may be held by the body 202 to interface with the power wires 152. The wire seal 250 may be manufactured from a different material from the body 202.

The TPA device 200 includes a TPA base 210 and a cover 230. The cover 230 is configured to be coupled to the TPA base 210 to cover one or more openings in the TPA base 210 and prevent ingress of material through the TPA device 200. The TPA device 200 includes terminal blocking elements 240 configured to block the terminals 150 and provide position assurance of the terminals 150 in the housing 110.

The TPA base 210 includes wire channel 212 passing therethrough that are configured to receive the corresponding power wires 152. In an exemplary embodiment, the TPA base 210 includes slots 214 that open to the wire channels 212. The power wires 152 may be loaded into the wire channels 212 through the slots 214. The TPA base 210 extends between a front 216 and a rear 218. The TPA base 210 includes a top 220 and a bottom 222. The TPA base 210 includes opposite sides 224, 226 that extend between the top 220 and the bottom 222. The TPA base 210 is sized and shaped to fit in the chamber 140 of the housing 110. In an exemplary embodiment, the TPA base 210 may be generally rectangular. Optionally, the TPA base 210 may include curved corners where the sides 224, 226 intersect with the top 220 and/or the bottom 222. The TPA base 210 may have other shapes in alternative embodiments.

The wire channels 212 pass through the TPA base 210 between the rear 218 in the front 216. In the illustrated embodiment, the slots 214 are provided at the bottom 222. However, the slots 214 may be located at the top 220 in alternative embodiments. In other alternative embodiments, the TPA base 210 may be provided without the slots 214. Rather, the power wires 152 may be loaded into the wire channels 212 through the rear 218.

In an exemplary embodiment, the terminal blocking elements 240 extend from the front 216 of the TPA base 210. The terminal blocking elements 240 extend to distal ends 242. The distal ends 242 are configured to interface with the terminals 150 to block the terminals 150 in the terminal channels 130 of the housing 110. In the illustrated embodiment, the TPA device 200 includes a pair of the terminal blocking elements 240 flanking both sides of each of the wire channels 212. Gaps 244 are provided between the terminal blocking elements 240. The gaps 244 configured to receive portions of the separating walls 132 of the housing 110. The terminal blocking elements 240 have openings at the top and the bottom between the terminal blocking elements 240. However, in alternative embodiments, the terminal blocking elements 240 may additionally or alternatively extend along the top and/or the bottom of the power wire 152 forward of the TPA base 210. For example, in various embodiments, the terminal blocking elements 240 may extend entirely circumferentially around the power wire 152 forming a cylindrical shroud around the power wire 152 rather than having the flanking terminal blocking elements 240 is shown in FIGS. 4-7.

In an exemplary embodiment, the TPA device 200 includes one or more latches 246 used to secure the TPA device 200 to the housing 110. In the illustrated embodiment, the latches 246 are provided at the sides 224, 226 of the TPA the base 210. The latches 246 extend forward of the TPA base 210. The latches 246 may be deflectable. In an exemplary embodiment, the latches 246 are configured to be released from the housing 110 to allow removal of the TPA device 200 from the housing 110. Other types of securing features may be used in alternative embodiments to secure the TPA device 200 to the housing 110, such as fasteners, clips, and the like.

In an exemplary embodiment, the cover 230 is configured to be coupled to the rear 218 of the TPA base 210. The cover 230 may cover portions of the wire channels 212. In an exemplary embodiment, the cover 230 is attached to the TPA base 210 by hinges 232. For example, the cover 230 may be integral with the TPA base 210, such as being co-molded with the TPA base 210 during a common molding process. However, in alternative embodiments, the cover 230 may be separate and discrete component from the TPA base 210 is configured to be coupled to the TPA base 210, such as after the wire seal 250 and/or the power wires 152 are received in the TPA base 210.

The cover 230 includes an end wall 234 that is configured to cover the rear end of the TPA base 210. In various embodiments, the cover 230 may include seal ribs 235 at the front portion of the end wall 234. The seal ribs 235 are configured to interface with the wire seal 250. For example, the seal ribs 235 may be pressed inward against the wire seal 250 when the cover 230 is coupled to the TPA base 210. The seal ribs 235 may hold the wire seal 250 in the TPA base 210. The seal ribs 235 may compress the wire seal 250 when the cover 230 is closed.

The cover 230 includes openings 236 aligned with the wire channels 212. The openings 236 are configured to receive the corresponding power wires 152. Optionally, the openings 236 may be open at a bottom of the cover 230 to allow installation of the cover 230 onto the TPA base 210 (for example, rotation of the cover 230 to the closed position.

In an exemplary embodiment, the cover 230 includes latching features 238 configured to secure the cover 230 to the TPA base 210. The latching features 238 may be deflectable latches configured to be latchably coupled to corresponding latching features 228 on the TPA base 210. The latching features 238 are used to close the cover 230 on the back of the TPA 200 to secure the wire seal 250 in the TPA 200. Other types of securing features may be used in alternative embodiments.

In an exemplary embodiment, the TPA base 210 includes a seal pocket 252 at the rear 218. The wire seal 250 is configured be received in the seal pocket 252. The cover 230 is used to hold the wire seal 250 in the seal pocket 252. In an exemplary embodiment, the TPA base 210 includes grooves at the bottom 222 that open to the seal pocket 252. The grooves 254 may be aligned with the slots 214. The grooves 254 configured to receive portions of the wire seal 250.

The wire seal 250 provides a seal between the power wires 152 and the TPA base 210. The wire seal 250 is used to seal the wire channels 212. In an exemplary embodiment, the wire seal 250 is manufactured from a foam material. The wire seal 250 may be manufactured from other materials in alternative embodiments, such as a rubber material. In various embodiments, the wire seal 250 may create a hermetic seal to the power wire 152. For example, the wire seal 250 may create a moisture seal to prevent ingress of moisture into the wire channels 212 and into the housing 110. In alternative embodiments, the wire seal 250 may be used to create a physical barrier to prevent material, such as insulation foam, from ingress into the wire channels 212 in the housing 110. For example, the wire seal 250 may fill the space between the power wires 152 and the TPA base 210 to ensure that the material is unable to flow or creep into the interior of the TPA device 200 and the housing 110. Optionally, the wire seal 250 may be compressible and/or pliable to fit in the spaces around the power wires 152 and the TPA base 210.

The wire seal 250 extends between a front 256 and a rear 258. The front 256 may be planar the rear 258 may be planar. The rear 258 may be parallel to the front 256. In an exemplary embodiment, the wire seal 250 includes openings 260 configured to receive the corresponding power wires 152. The openings 260 are configured to be aligned with the wire channels 212. In the illustrated embodiment, the openings 260 are cylindrical and sized to receive the power wires 152. Optionally, the openings 260 may have a diameter slightly smaller than a diameter of the power wire 152 to ensure that the wire seal 250 seals against the power wire 152 when the power wire 152 is received in the opening 260. For example, the wire seal 250 may compress or stretch around the opening 260 to receive the power wire 152 to ensure that the wire seal 250 is in sealing engagement with the power wire 152.

In an exemplary embodiment, the wire seal 250 includes slits 262 extending from the openings 260 and outer perimeter of the wire seal 250, such as at the bottom. The slits 262 allow the power wires 152 to pass through the slits 262 into the openings 260 during assembly. In an exemplary embodiment, the wire seal 250 includes flanges 264 on opposite sides of the slits 262. The flanges 264 are configured to be received in the grooves 254. The flanges 264 engage the TPA base 210 to hold the slits 262 closed, such as to prevent ingress of the insulation foam material through the slits 262 once the TPA device 200 is assembled.

In an exemplary embodiment, the housing sealing portion 206 of the TPA device 200 is configured to interface with the housing 110 to create a barrier between the housing 110 and the TPA device 200 to prevent ingress of material into the housing 110. In an exemplary embodiment, the housing sealing portion 206 is provided on the exterior of the TPA base 210. The housing sealing portion 206 may be located at the top 220 and/or the bottom 222 and/or the first side 224 and/or the second side 226. In an exemplary embodiment, the housing sealing portion 206 includes at least one interference rib 280 configured to engage the housing 110. The interference rib 280 is stepped outward from the adjacent portion of the TPA base 210. In an exemplary embodiment, the interference rib 280 engages the housing 110 by an interference fit. Optionally, the interference rib 280 may be compressible. For example, the interference rib 280 may be configured to be elastically deformed or plastically deformed when the interference rib 280 engages the housing 110. Optionally, the interference rib 280 may be a crush rib configured be crushed when the TPA device 200 is plugged into the chamber 140 of the housing 110.

In an exemplary embodiment, the top 220 includes at least one interference rib 280 and/or the bottom 222 includes at least one interference rib 280 and/or the first side 224 includes at least one interference rib 280 and/or the second side 226 includes at least one interference rib 280. In an exemplary embodiment, the interference rib 280 extends entirely circumferentially around the exterior of the TPA base 210. For example, the interference rib 280 is continuous around the perimeter of the TPA base 210 to form a circumferential band 282. The circumferential band 282 is configured to interface with the housing 110 at the top, the bottom, and both sides of the chamber 140. In alternative embodiments, the interference ribs 280 may be discontinuous. For example, multiple interference ribs 280 may be provided, such as parallel ribs extending longitudinally along the TPA base 210. The interference ribs 280 may be angled and overlapping such that straight-line paths extend along the exterior of the TPA base 210. The interference ribs 280 may have a saw tooth pattern around the TPA base 210 defining multiple areas of interference between the TPA base 210 and the housing 110 to substantially close any gap or area of ingress to seal the TPA base 210 to the housing 110, such as to prevent the insulation foam from entering the interior of the housing 110. The interference ribs 280 may be multiple bands or ribs extending around the TPA base 210 and axially spaced apart from each other (for example, offset front-to-rear relative to each other).

In an exemplary embodiment, the TPA base 210 includes a rear block 284 at the rear 218 of the TPA base 210. The rear block 284 is a portion of the TPA base 210 is configured to remain outside of the housing 110, such as rearward of the housing 110, whereas the portion of the TPA base 210 forward of the rear block 284 is configured to be plugged into the chamber 140 of the housing 110. The interference rib 280 is located forward of the rear block 284, such as located immediately forward of the rear block 284. The rear block 284 may be wider and/or taller than the interference rib 280. For example, the TPA base 210 may be stepped inward at the interference rib 280 compared to the rear block 284. In an exemplary embodiment, the TPA base 210 is stepped inward forward of the interference rib 280. For example, the TPA base 210 is narrower and/or shorter forward of the interference rib 280, wherein the forward portion of the TPA base 210 may be plugged into the chamber 140 without engaging the housing 110, whereas the interference rib 280 is configured to engage the housing 110 when the interference rib 280 is plugged into the housing 110.

Figure 8:
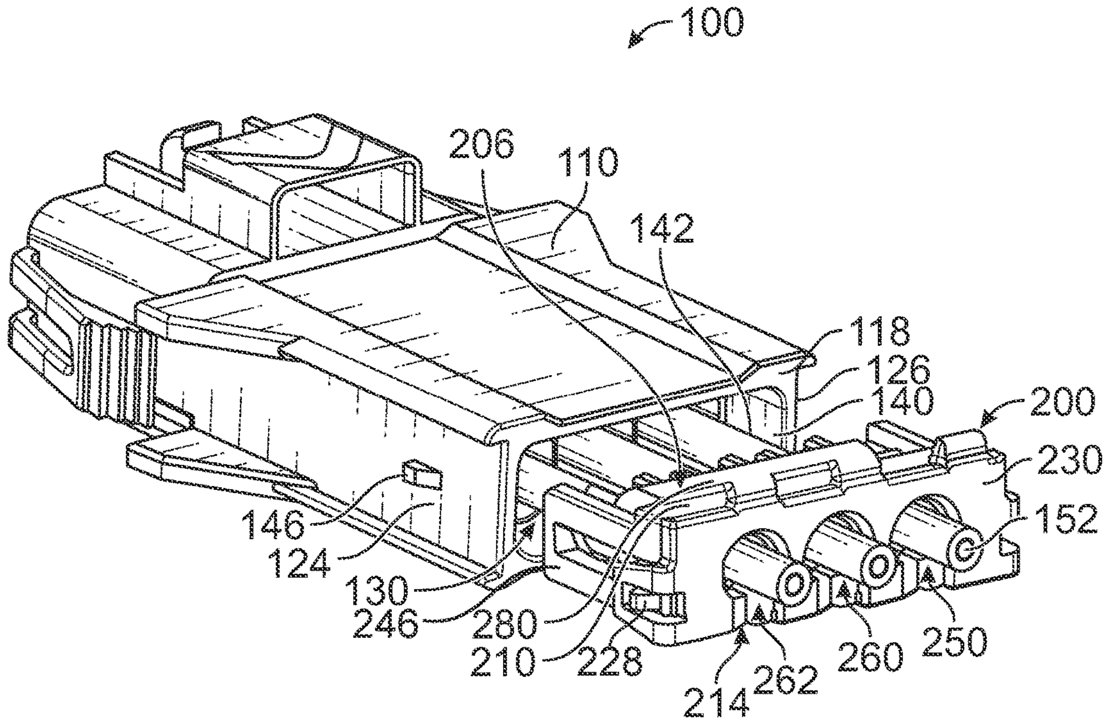
FIG. 8 is a rear perspective view of the power connector showing the TPA device poised for loading into the housing in accordance with an exemplary embodiment.

FIG. 8 is a rear perspective view of the power connector 100 showing the TPA device 200 poised for loading into the housing 110. During assembly, the terminals 150 and the power wires 152 may be loaded into the terminal channels 130 of the housing 110. For example, the terminals 150 and the power wires 152 may be rear loaded into the housing 110 through the rear 118. The TPA device 200 is configured to be coupled to the power wires 152 and the housing 110 after the terminals 150 are loaded into the housing 110. For example, the assembled TPA device 200 may be pressed onto the power wires 152 in a downward mating direction and then the TPA device 200 may be slid forward into the housing 110 in a forward loading direction.

The slots 214 at the bottom of the TPA base 210 provide access to the wire channels 212 and allow loading of the TPA device 200 onto the power wires 152 in the downward mating direction. Additionally, the openings 236 are open at the bottom of the cover 230 to receive the power wires 152 as the TPA device 200 is loaded onto the power wires 152. The slits 262 and the wire seal 250 allow the power wires 152 to pass through the wire seal 250 into the openings 260.

During assembly, the TPA device 200 may be slid in the forward loading direction along the power wires 152 to couple with the housing 110. The TPA base 210 is configured to be plugged into the chamber 140 at the rear 118 of the housing 110. For example, the housing sealing portion 206 is configured to be plugged into the chamber 140 to seal the TPA device 200 to the housing 110. In an exemplary embodiment, the interference rib 280 is configured to engage the interior surface 142 of the housing 110 to seal the TPA device 200 to the housing 110. The terminal blocking elements 240 are received in the corresponding terminal channels 130 rearward of the terminals 150 to block the terminals 150 in the terminal channels 130 and prevent pullout of the terminals 150 from the housing 110. The latches 246 are used to secure the TPA device 200 to the housing 110. For example, the latches 246 interface with corresponding latches 146 at the sides 124, 126 of the housing 110.

Figure 9:
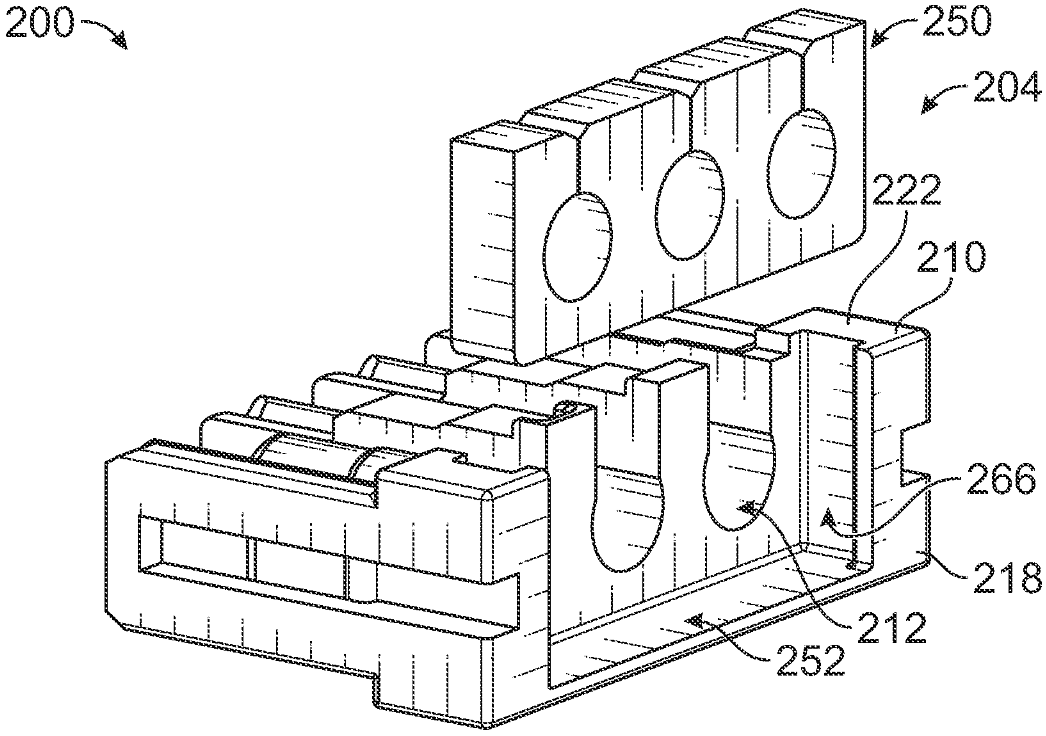
FIG. 9 is a bottom perspective view of the TPA device in accordance with an exemplary embodiment.
Figure 10:
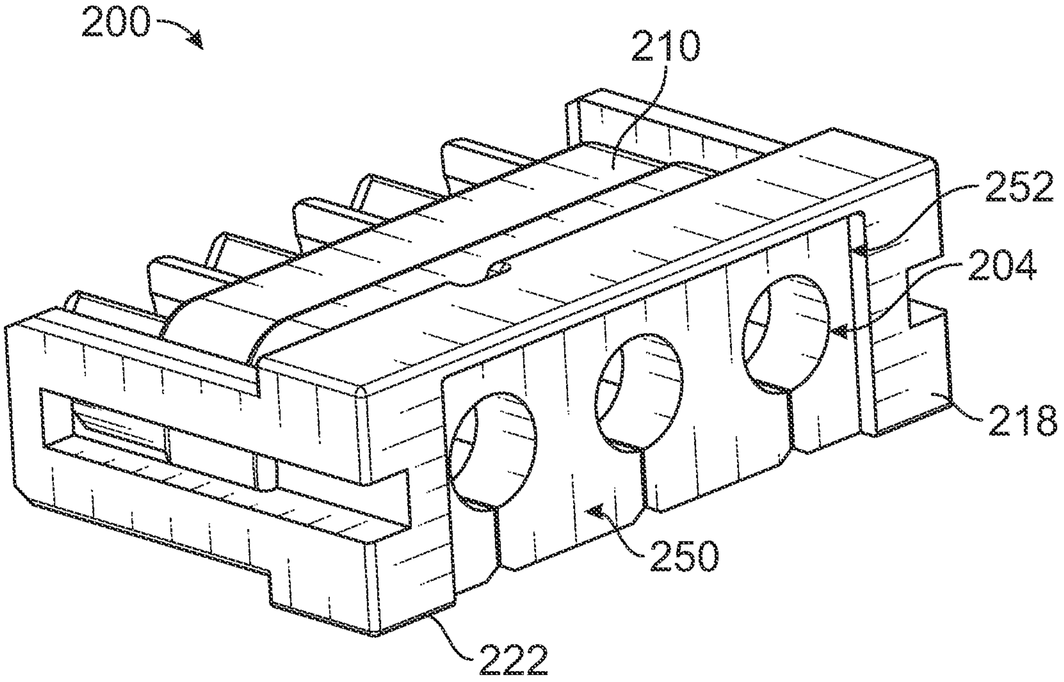
FIG. 10 is a top perspective view of the TPA device in accordance with an exemplary embodiment.

FIG. 9 is a bottom perspective view of the TPA device 200 in accordance with an exemplary embodiment. FIG. 10 is a top perspective view of the TPA device 200 in accordance with an exemplary embodiment. The wire seal 250 is shown poised for loading into the TPA base 210 in FIG. 9. The wire seal 250 is shown located in the TPA the base 210 in FIG. 10. FIGS. 9 and 10 illustrate an embodiment of the TPA device 200 without any cover (for example, the cover 230 shown in FIG. 4). The wire seal 250 forms the wire sealing portion 204 of the TPA device 200. For example, the wire seal 250 forms a barrier that prevents ingress of material, such as the insulation foam, into the wire channels 212 of the TPA base 210. The wire seal 250 prevents the material from flowing or creeping into the interior of the TPA base 210.

The TPA base 210 includes the seal pocket 252 at the rear 218. The seal pocket 252 is formed by rails or channels 266 along the sides of the seal pocket 252. The channels 266 receive the wire seal 250 and are used to position the wire seal 250 relative to the TPA base 210. During assembly, the wire seal 250 is loaded into the seal pocket 252 through the bottom 222. The wire seal 250 may be held in the seal pocket 252 using adhesive, a epoxy, or other securing features optionally, a cover (not shown) may be secured to the bottom 222 after the wire seal 250 is loaded into the seal pocket 252.

Figure 11:
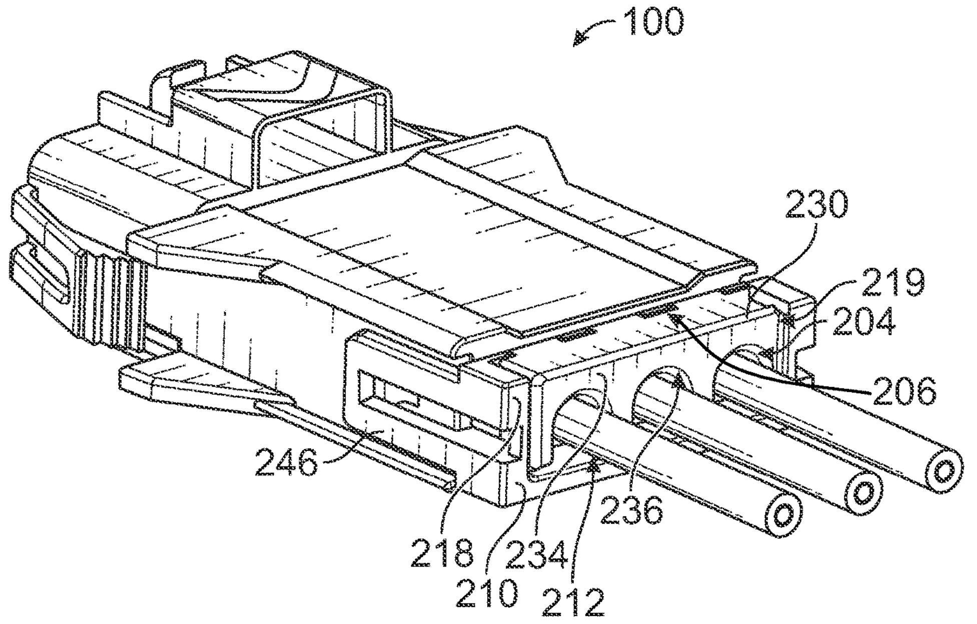
FIG. 11 is a rear perspective view of the power connector in accordance with an exemplary embodiment.
Figure 12:
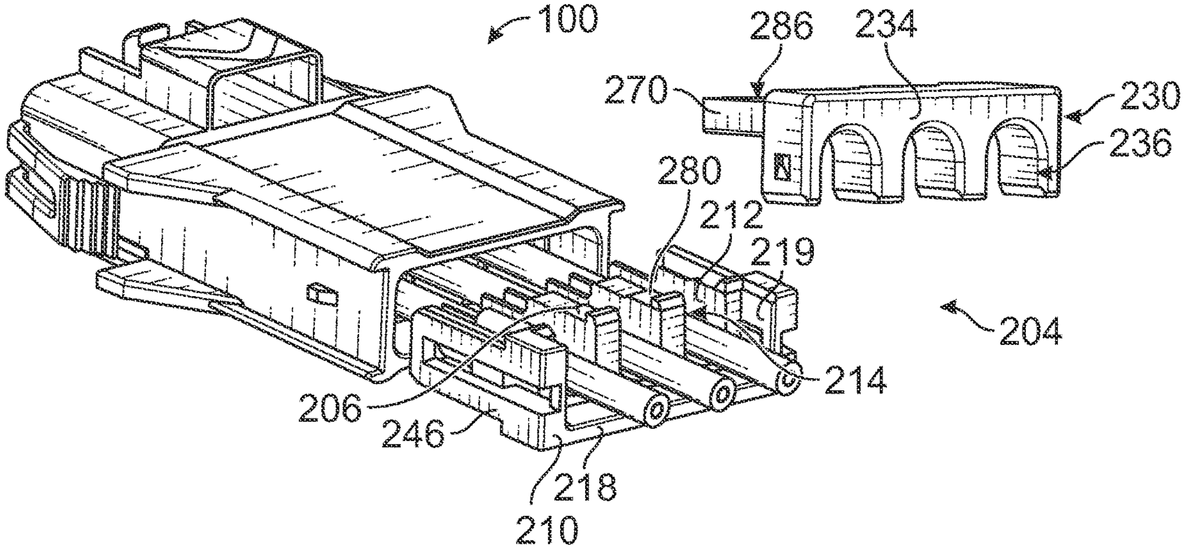
FIG. 12 is an exploded view of the power connector shown in FIG. 11 in accordance with an exemplary embodiment.

FIG. 11 is a rear perspective view of the power connector 100 in accordance with an exemplary embodiment. FIG. 12 is an exploded view of the power connector 100 shown in FIG. 11. The power connector 100 shown in FIGS. 11 and 12 is provided without any wire seal (such as the wire seal 250 shown in FIG. 4). The TPA base 210 and the cover 230 of the power connector 100 shown in FIGS. 11 and 12 are shaped differently to provide the wire sealing portion 204 and the housing sealing portion 206 at the rear of the power connector 100.

Figure 13:
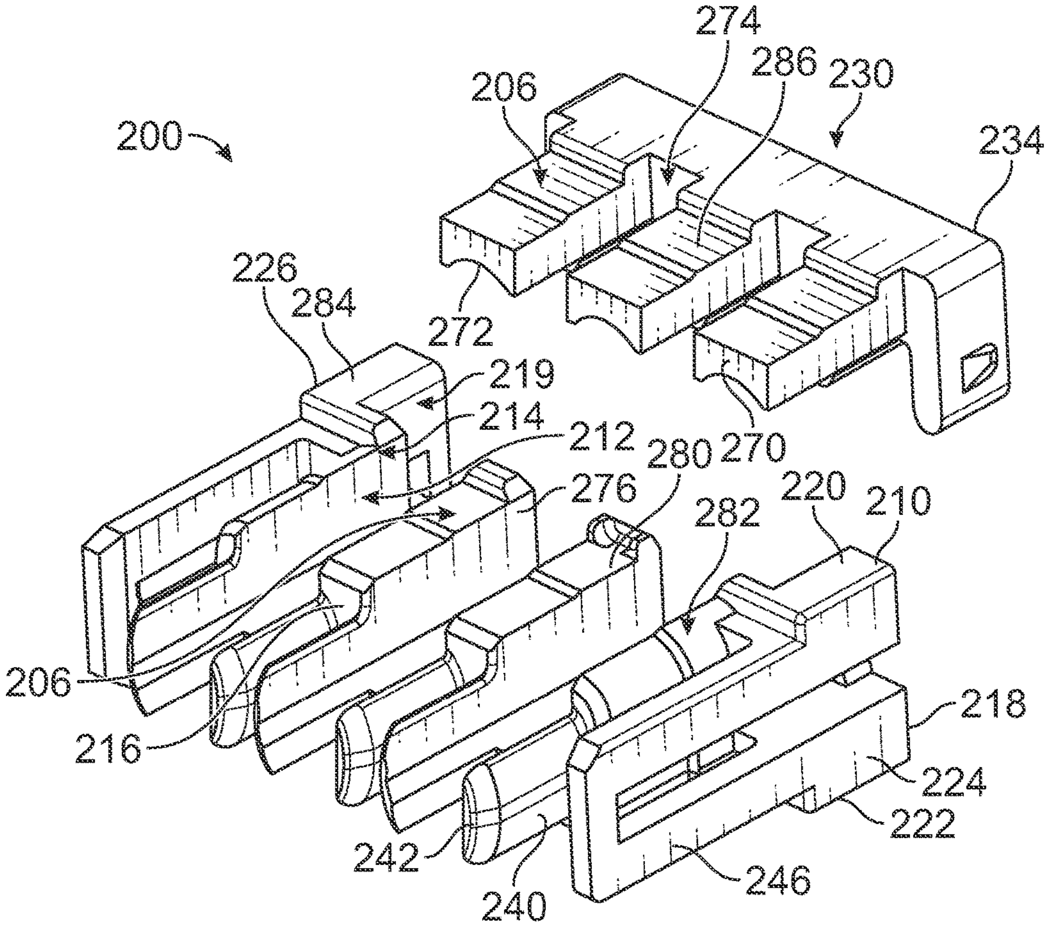
FIG. 13 is a front perspective view of the TPA device for the power connector shown in FIGS. 11 and 12 in accordance with an exemplary embodiment.
Figure 14:
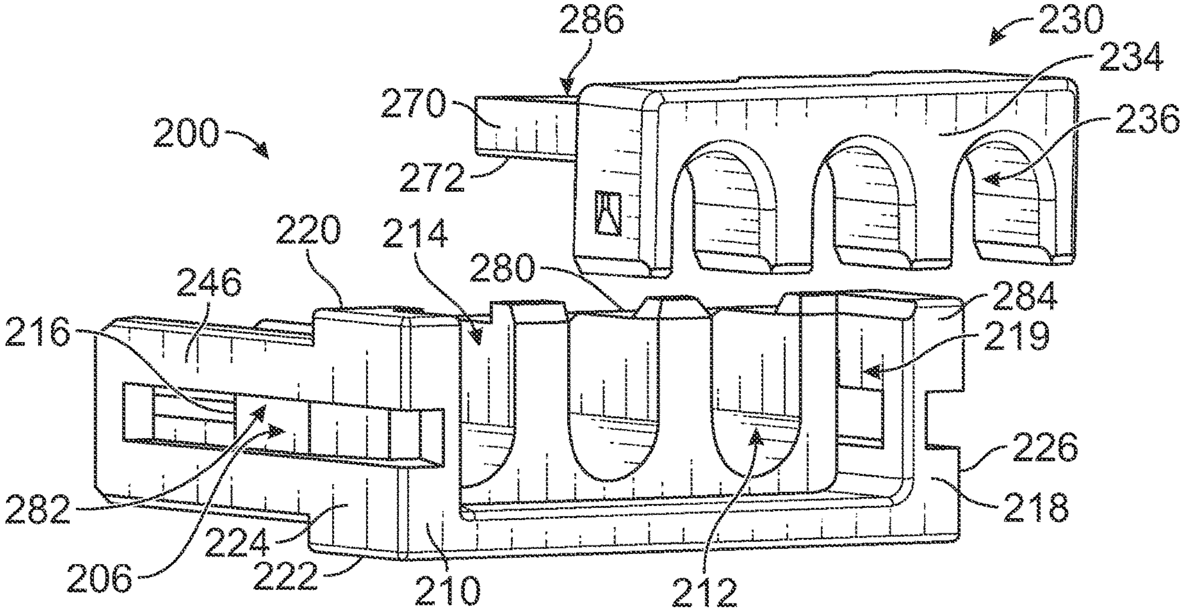
FIG. 14 is a rear perspective view of the TPA device for the power connector shown in FIGS. 11 and 12 in accordance with an exemplary embodiment.

FIG. 13 is a front perspective view of the TPA device 200 for the power connector 100 shown in FIGS. 11 and 12 in accordance with an exemplary embodiment. FIG. 14 is a rear perspective view of the TPA device 200 for the power connector 100 shown in FIGS. 11 and 12 in accordance with an exemplary embodiment.

The TPA device 200 includes the TPA base 210 and the cover 230. The cover 230 is configured to be coupled to the TPA base 210 to cover one or more openings in the TPA base 210 and prevent ingress of material through the TPA device 200. The TPA device 200 includes the terminal blocking elements 240 configured to block the terminals 150 and provide position assurance of the terminals 150 in the housing 110.

The TPA base 210 includes the wire channel 212 passing therethrough that are configured to receive the corresponding power wires 152. In an exemplary embodiment, the TPA base 210 includes the slots 214 at the top 220 that open to the wire channels 212. The power wires 152 may be loaded into the wire channels 212 through the slots 214. The TPA base 210 extends between the front 216, the rear 218, the top 220, the bottom 222, and the sides 224, 226. The wire channels 212 pass through the TPA base 210 between the rear 218 in the front 216. In an exemplary embodiment, the terminal blocking elements 240 extend from the front 216 of the TPA base 210 to the distal ends 242. The latches 246 are provided at the sides 224, 226 of the TPA the base 210.

In an exemplary embodiment, the cover 230 is configured to be coupled to the rear 218 of the TPA base 210. For example, the cover 230 may be received in a pocket 219 at the rear 218. The cover 230 may cover portions of the wire channels 212. In the illustrated embodiment, the cover 230 is separate and discrete from the TPA base 210. For example, the cover 230 may be separately molded and is configured to be coupled to the TPA base 210 using latches or other securing features.

The cover 230 includes the end wall 234 that is configured to be received in the pocket 219 to cover the rear end of the TPA base 210. The end wall 234 includes the openings 236, which are configured to be aligned with the wire channels 212. The openings 236 are configured to receive the corresponding power wires 152. Optionally, the openings 236 may be open at a bottom of the cover 230 to allow installation of the cover 230 onto the power wires 152.

In an exemplary embodiment, the cover 230 includes plugs 270 extending forward from the end wall 234. The plugs 270 are configured to be plugged into the TPA base 210, such as into the slots 214, to cover portions of the power wires 152. The plugs 270 may extend along the top side of the TPA base 210 to cover the top portions of the power wires 152. In an exemplary embodiment, the plugs 270 form portions of the wire channels 212. For example, the plugs 270 fill the slots 214 to close the open portions of the wire channels 212. Optionally, the interior surfaces 272 of the plugs 270 may be curved to follow the curvature of the power wires 152. The plugs 270 are separated by gaps 274. The walls 276 of the TPA base 210 are received in the gaps 274. The walls 276 may fill the gaps 274. For example, when the cover 230 is coupled to the TPA base 210 of the cover 230 and the TPA base 210 form a nested structure that surrounds the power wires 152.

In an exemplary embodiment, the housing sealing portion 206 of the TPA device 200 is configured to interface with the housing 110 to create a barrier between the housing 110 and the TPA device 200 to prevent ingress of material into the housing 110. In an exemplary embodiment, the housing sealing portion 206 is defined by the combined, nested structure of the TPA base 210 and the cover 230. The housing sealing portion 206 is provided on the exterior of the TPA base 210 and the plugs 270 of the cover 230. The housing sealing portion 206 may be located at the top 220 and/or the bottom 222 and/or the first side 224 and/or the second side 226. In an exemplary embodiment, the plugs 270 of the cover 230 form sections of the housing sealing portion 206 at the top 220. For example, the plugs 270 include interference ribs 286 that cooperate with the interference ribs 280 of the TPA base 210 to form the housing sealing portion 206. In an exemplary embodiment, the interference rib(s) 280, 286 extend entirely circumferentially around the exterior of the TPA base 210. For example, the interference ribs 280, 286 form a continuous sealing portion or band around the perimeter of the TPA device 200. The circumferential band 282 is configured to interface with the housing 110 at the top, the bottom, and both sides of the chamber 140.

In an exemplary embodiment, the TPA base 210 includes the rear block 284 at the rear 218 of the TPA base 210. The cover 230 may form part of the rear block 284, such as at the top of the TPA device 200. The interference rib 280, 286 is located forward of the rear block 284, such as located immediately forward of the rear block 284.

Returning to FIGS. 11 and 12, during assembly, the terminals 150 and the power wires 152 may be loaded into the terminal channels 130 of the housing 110. For example, the terminals 150 and the power wires 152 may be rear loaded into the housing 110 through the rear 118. The TPA device 200 is configured to be coupled to the power wires 152 and the housing 110 after the terminals 150 are loaded into the housing 110. For example, the TPA base 210 may be loaded onto the power wires 152 in an upward mating direction and then the TPA base 210 may be slid forward into the housing 110 in a forward loading direction. The cover 230 may be coupled to the TPA base 210 after the TPA base 210 is loaded into the housing 110.

The slots 214 at the top of the TPA base 210 provide access to the wire channels 212 and allow loading of the TPA device 200 onto the power wires 152 in the upward mating direction. The wire channels 212 may be sized to accommodate the power wires 152. For example, the wire channels 212 may have a radius of curvature similar to the radius of curvature of the jacket of the power wire 152 such that the power wire 152 is snugly held in the wire channel 212. In an exemplary embodiment, the power wires 152 are held in the wire channels 212 without gaps or spaces between the power wires 152 and the TPA base 210. The cover 230 is configured to be coupled to the power wires 152 and the TPA base 210 from above and/or from the rear. The openings 236 are open at the bottom of the cover 230 to receive the power wires 152 as the TPA device 200 is loaded onto the power wires 152. During assembly, the plugs 270 of the cover 230 are aligned with the slots 214. The plugs 270 may be loaded into the slots 214 from above and/or from behind. For example, the cover 230 may be initially lowered onto the power wires 152 and then slid in a forward loading direction to load the plugs 270 into the slots 214. When assembled, the end wall 234 is received in the pocket 219 at the rear 218 of the TPA base 210. The openings 236 are sized to accommodate the power wires 152. For example, the opening 236 may have a radius of curvature similar to the radius of curvature of the jacket of the power wire 152 such that the power wire 152 is snugly held in the opening 236. The cover 230 and the TPA base 210 defined the wire sealing portion 204. The cover 230 and the TPA base 210 prevent ingress of material, such as the insulation foam into the interior of the TPA device 200 along the power wires 152.

During assembly, when the TPA base 210 and the cover 230 are slid forward into the housing 110, the TPA base 210 and the cover 230 fill the rearward portion of the chamber 140. The housing sealing portion 206 is configured to be plugged into the chamber 140 to seal the TPA device 200 to the housing 110. In an exemplary embodiment, the interference ribs 280, 286 are configured to engage the interior surface 142 of the housing 110 to seal the TPA device 200 to the housing 110. The terminal blocking elements 240 are received in the corresponding terminal channels 130 rearward of the terminals 150 to block the terminals 150 in the terminal channels 130 and prevent pullout of the terminals 150 from the housing 110. The latches 246 are used to secure the TPA device 200 to the housing 110. For example, the latches 246 interface with the corresponding latches 146 at the sides 124, 126 of the housing 110.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power connector comprising:

a housing extending between a mating end and a wire end, the mating end configured to be mated with a mating power connector, the housing including a terminal channel, the housing including a chamber at the wire end;

a terminal received in the terminal channel, the terminal including a mating end configured to be mated to a mating terminal of the mating power connector, the terminal including a terminating end terminated to a power wire, the power wire extending from the wire end of the housing; and a terminal position assurance (TPA) device received in the chamber, the TPA device including a terminal blocking element rearward of the terminal for blocking and position assurance of the terminal in the terminal channel, the TPA device including a sealing element for sealing the chamber of the housing.

2. The power connector of claim 1, wherein the sealing element engages the housing in the chamber to seal the TPA device to the housing.

3. The power connector of claim 1, wherein sealing element includes an interference ribs engaging the housing by an interference fit.

4. The power connector of claim 1, wherein the sealing element includes a circumferential band surrounding an exterior of the TPA device to engage an interior surface of the housing to seal the TPA device to the housing.

5. The power connector of claim 1, wherein the TPA device includes a wire channel receiving the power wire, the TPA device sealed to the power wire passing through the wire channel.

6. The power connector of claim 1, wherein the TPA device further comprises a wire seal sealed to the power wire.

7. The power connector of claim 1, wherein the TPA device includes a TPA base having a wire channel, the TPA base including a seal pocket, the TPA device including a wire seal received in the seal pocket, the wire seal being sealed between the power wire in the TPA base.

8. The power connector of claim 1, wherein the TPA device includes a TPA base having a wire channel receiving the power wire and a cover to close the wire channel.

9. The power connector of claim 8, wherein the cover is hingedly coupled to the TPA base.

10. The power connector of claim 8, wherein the cover is latchably coupled to the TPA base.

11. The power connector of claim 8, wherein the TPA base includes a slot at a top of the TPA base open to the wire channel, the wire being loaded into the wire channel through the slot, the cover including a plug plugged into the slot to close the slot.

12. The power connector of claim 1, wherein the terminal channel is one of a plurality of terminal channels and the terminal is one of a plurality of terminals received in the corresponding terminal channels, the terminal blocking element being one of a plurality of terminal blocking elements received in the corresponding terminal channels to block and assure position of the corresponding terminals.

13. The power connector of claim 12, wherein the sealing element of the TPA device provides sealing around all of the terminals within the chamber of the housing.

14. The power connector of claim 12, wherein the cable is one of a plurality of cables terminated to the corresponding terminals, the TPA device including a wire seal sealed between the TPA device and the plurality of the cables.

15. The power connector of claim 1, wherein the TPA device includes a latch latchably coupled to the housing.

16. A power connector comprising:

a housing extending between a mating end and a wire end, the mating end configured to be mated with a mating power connector, the housing including a terminal channel, the housing including a chamber at the wire end;

a terminal received in the terminal channel, the terminal including a mating end configured to be mated to a mating terminal of the mating power connector, the terminal including a terminating end terminated to a power wire, the power wire extending from the wire end of the housing; and a terminal position assurance (TPA) device received in the chamber, the TPA device including a terminal blocking element rearward of the terminal for blocking and position assurance of the terminal in the terminal channel, the TPA device including a sealing element for sealing the chamber of the housing, the TPA device including a wire seal configured to be sealed between the TPA device and the power wire.

17. The power connector of claim 16, wherein the sealing element engages the housing in the chamber to seal the TPA device to the housing.

18. The power connector of claim 16, wherein the TPA device includes a TPA base having a wire channel, the TPA base including a seal pocket, the wire seal received in the seal pocket, the wire seal being sealed between the power wire in the TPA base.

19. The power connector of claim 16, wherein the TPA device includes a TPA base having a wire channel receiving the power wire and a cover to close the wire channel.

20. A power connector comprising:

a housing extending between a mating end and a wire end, the mating end configured to be mated with a mating power connector, the housing including a terminal channel, the housing including a chamber at the wire end;

a terminal received in the terminal channel, the terminal including a mating end configured to be mated to a mating terminal of the mating power connector, the terminal including a terminating end terminated to a power wire, the power wire extending from the wire end of the housing; and a terminal position assurance (TPA) device received in the chamber, the TPA device including a TPA base including a wire channel configured to receive the power wire, the TPA base including a sealing element for sealing the chamber of the housing, the TPA device including a terminal blocking element rearward of the terminal for blocking and position assurance of the terminal in the terminal channel, the TPA device including a cover coupled to the TPA base to close the wire channel.

21. The power connector of claim 20, wherein the sealing element engages the housing in the chamber to seal the TPA device to the housing.

22. The power connector of claim 20, wherein the TPA base includes a seal pocket, the TPA device including a wire seal received in the seal pocket, the wire seal being sealed between the power wire in the TPA base.

23. The power connector of claim 20, wherein the TPA base includes a slot at a top of the TPA base open to the wire channel, the wire being loaded into the wire channel through the slot, the cover including a plug plugged into the slot to close the slot.

* * * * *